United States Patent [19]

Bantle et al.

[11] Patent Number: 4,872,372
[45] Date of Patent: Oct. 10, 1989

[54] CONTROLLER FOR LOCKABLE DIFFERENTIAL TRANSMISSION

[75] Inventors: Manfred Bantle, Vaihingen/Enz; Volker Munz, Ludwigsburg; Bernd Zackl, Friolzheim; Matthias Dietz, Bietigheim-Bissingen; Eberhard Armbrust, Renningen, all of Fed. Rep. of Germany

[73] Assignee: Dr. Ing. H.c.F. Porsche AG, Weissach, Fed. Rep. of Germany

[21] Appl. No.: 188,214

[22] Filed: Apr. 29, 1988

[30] Foreign Application Priority Data

Apr. 29, 1987 [DE] Fed. Rep. of Germany ....... 3714332

[51] Int. Cl.$^4$ .............................................. F16H 1/44
[52] U.S. Cl. ...................................... 74/710.5; 74/857
[58] Field of Search ...................... 74/710.5, 710, 711, 74/857; 180/197, 249

[56] References Cited

U.S. PATENT DOCUMENTS

| | | | |
|---|---|---|---|
| 4,562,541 | 12/1985 | Sakakiyama et al. | 180/197 X |
| 4,669,569 | 6/1987 | Juzuki et al. | 74/710.5 X |
| 4,702,341 | 10/1987 | Taga et al. | 180/249 |
| 4,711,317 | 12/1987 | Sakakiyama | 180/197 |
| 4,751,856 | 6/1988 | Nakamura et al. | 74/710.5 X |
| 4,754,835 | 7/1988 | Stelter et al. | 180/248 |
| 4,766,973 | 8/1988 | Kashihara et al. | 180/249 |
| 4,768,609 | 9/1988 | Taga et al. | 180/249 |
| 4,776,421 | 10/1988 | Kashihara | 180/197 |
| 4,792,011 | 12/1988 | Stelter et al. | 180/249 X |

FOREIGN PATENT DOCUMENTS 3608059  7/1987 Fed. Rep. of Germany .
62-261538 11/1987 Japan .................................. 180/249

OTHER PUBLICATIONS

H. Bott and M. Babtk, "Der Porcshe Typ 959–Gruppe B–ein besonderes Automobil" Part 2, ATZ 88 (6/1986), vol. 6, pp. 353 to 356.

M. Bantle and H. Borr, "The Porsche 959" pp. 19–33 (1988).

Primary Examiner—Dwight G. Diehl
Attorney, Agent, or Firm—Barnes & Thornburg

[57] ABSTRACT

For improving the load-change behavior of a motor vehicle when driving through a curve, the motor vehicle is provided with a lockable differential continuously activatable in its locking action. The activation of the locking differential takes place in the first instance in two steps dependent on power output, whereby a velocity-dependent characteristic may be superimposed additionally on this power output-dependent control.

17 Claims, 3 Drawing Sheets

CONTROLLER FOR LOCKABLE DIFFERENTIAL TRANSMISSION

BACKGROUND AND SUMMARY OF THE INVENTION

The present invention relates to an arrangement for the control of the power transmission to at least one axle of a motor vehicle provided with a lockable differential.

With multi-axle high power motor vehicles or with such motor vehicles, in which one axle is loaded more strongly than another, a load change when driving through a curve leads frequently to a more or less strong unstable driving behavior. If, for example, the driver of the motor vehicle drives through a curve and then suddenly takes his foot off the drive pedal, a jerk in the drive connection which occurs as a result thereof, especially at the unloaded curve-inner wheel of the driving axle, may lead to the loss of the contact friction between this wheel and the road surface. In that case, generally only half the transverse guide force is then available at this axle so that with higher transverse accelerations this leads to a turning-in with rear driven or rear loaded four-wheel drive motor vehicles, respectively, to a pushing of the vehicle by way of the front wheels (leaving the curve in a tangential direction) with front-driven or front-loaded four-wheel driven vehicles.

It is known to utilize in motor vehicles lockable or automatically locking differentials for avoiding a loss of the contact friction of the driven wheels. The action thereof, however, only starts after a loss of the friction contact so that it is not possible to sufficiently counteract the described turning-in, respectively, leaving of the curve.

It is also known to improve the load-change behavior of a motor vehicle by constructive measures, for example, in that one takes care for a more balanced axle load distribution by relocation of aggregates or axle arrangement points or by costly axle constructions. This, however, leads frequently to space problems in the vehicle or deteriorates under certain circumstances the inherent steering behavior of the vehicle, i.e., the steering behavior of the vehicle itself, in such a manner that the vehicle is no longer controllable within the limit range, respectively, a certain self-stabilizing influence is no longer present as exist, for example, with a vehicle with an eccentrically displaced center of gravity.

It is therefore the object of the present invention to so further develop a motor vehicle of the aforementioned type that the load-change behavior when driving through curves, especially in the curve boundary range, is decisively improved.

The underlying problems are solved according to the present invention in that the differential is continuously controllable in its locking action by way of an adjusting member activated by a control apparatus, preferably equipped with a microprocessor, in dependence on operating and/or driving parameters, a power output of an internal combustion engine serves as controlling operating parameter, and the control apparatus acts upon the adjusting member up to a power output value lying within a power band available from the internal combustion engine with a first value of a control magnitude corresponding to a higher locking value and above this power output value with a second value of a control magnitude corresponding to a lower locking value.

The advantages of the present invention reside in the first instance in the improved load-change behavior when driving through curves and in that compared to a conventional control arrangement for lockable differentials, no additional signals must be detected and processed.

The use of locking differentials in motor vehicles that are adapted to be activated continuously in their locking action is known as such, for example, from the DE-PS 34 37 435 corresponding to U.S. Pat. No. 4,754,835, from the DE-PS 34 37 436 corresponding to U.S. Pat. No. 4,792,011 and from the DE-OS 36 08 059 corresponding to U.S. Ser. No. 24,068 filed Mar. 10, 1987 and from the article by H. Bott and M. Babtke, "Der Porsche Typ 959 — Gruppe B — ein besonderes Automobil" ["The Porsche Typ 959 — Group B — A Special Automobile"]—Part 2, ATZ 88 (1986), Volume 6, pages 353 to 356 and is described therein in detail.

It has now been found that the turning-in behavior of such a four-wheel drive automobile can be decisively improved during a load change in curves by a permanent partial activation (for example 20% of the locking action) of the lockable cross-differential. However, in order to avoid thereby excessive stresses in the differential at higher velocities, the activating value may be reduced dependent upon exceeding a power output threshold at, for example, 50% full load, to a 5% locking action without resulting thereby again in any negative influence on the turning-in behavior.

For the improvement of the steerability at lower velocity (parking ability) and low engine output, it may be additionally appropriate to completely cancel the locking action below the power output threshold, respectively, below, for example, 20 km/h and to raise the same to the higher activating value of 20%, respectively, the power-dependent predetermined activating value within a velocity range between, for example, 20 km/h and 50 km/h.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
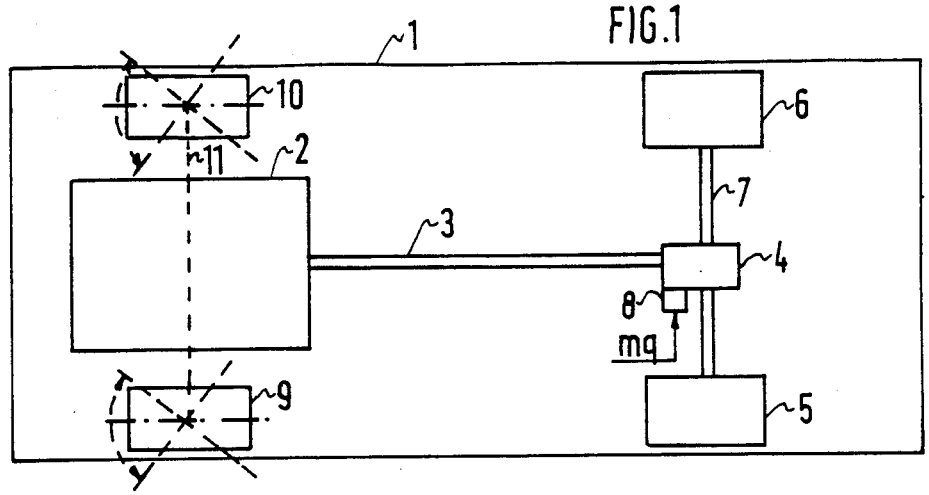
FIG. 1 is a schematic view of a drive unit of a motor vehicle in accordance with the present invention.

Referring now to the drawing wherein like reference numerals are used throughout the various views to designate like parts, and more particularly to FIG. 1, a motor vehicle 1 is shown in this figure whose internal combustion engine 2 drives by way of a clutch-transmission unit (not shown) and a shaft 3 and a differential 4 continuously controllable in its locking action, the wheels 5 and 6 of an axle 7. The differential 4 is thereby actuated by means of an adjusting member 8 in dependence on a control magnitude mq. The wheels 9 and 10 of a further axle 11 are not necessarily driven. However, the schematic showing of FIG. 1 only represents one example without limiting the generality of known drive systems utilizable with the present invention. With four-wheel drive vehicles, however, the control will generally be limited to the main drive axle.

Figure 2:
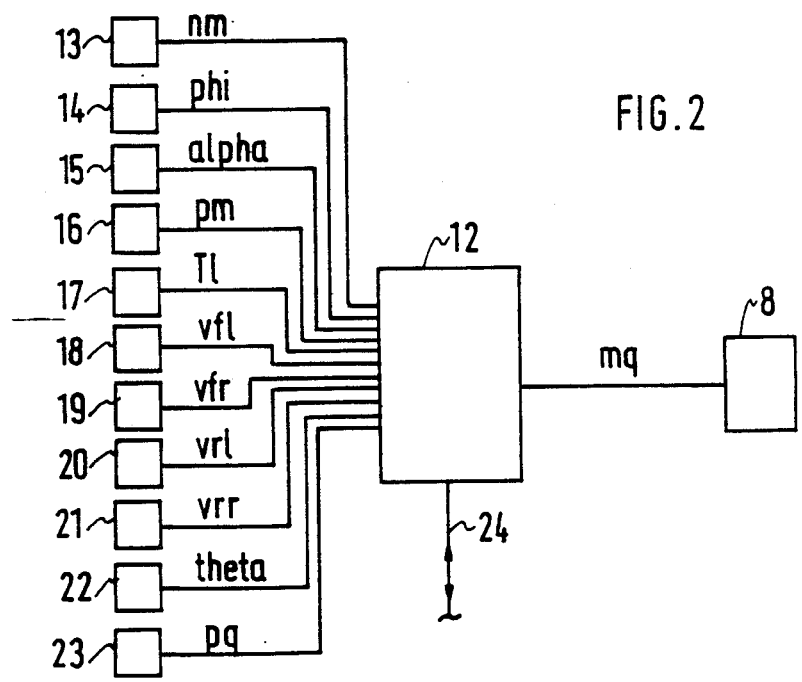
FIG. 2 is a schematic block diagram of a control apparatus with input and output magnitudes in accordance with the present invention.

A control apparatus 12 (FIG. 2) for preparing the control magnitude mq for the adjusting member 8 is preferably built according to known microcomputer techniques and is equipped, for example, with an Intel microprocessor of the type 8051 (single-chip microprocessor) with all external components necessary for its operation as well as external additional RAM and ROM components (not shown). For that purpose the control apparatus 12 receives signals from an engine rotational speed transmitter 13 (engine rotational speed nm), from a drive pedal transmitter 14 (drive pedal position phi) or from a throttle valve angle transmitter 15 (throttle valve angle alpha), with internal combustion engines having a turbocharger additionally from a charging pressure transmitter 16 (charging pressure pm) and a charging air temperature transmitter (suction air temperature T1) and from rotational speed transmitters 18 and 19 which produce signals corresponding to the rotational speed or velocity of the non-driven wheels 9 (rotational speed left forward, vfl) and 10 (rotational speed right forward, vfr) (with four-wheel drive vehicles: rotational speeds of the wheels at the auxiliary drive axle or true driving velocities above ground). As further control magnitudes there may be detected the rotational speeds of the wheels 5 and 6 (rotational speed left rear, vrl; rotational speed right rear, vrr) from by rotational speed transmitters 20, 21 and/or from a steering angle transmitter 22 (steering angle theta) and/or from a pressure transducer 23 (control pressure pq) at the differential for the control of a pressure regulation and may be fed to the control apparatus 12. The control apparatus 12 may also communicate by way of a data line 24 with further control apparatus, for example, with an anti-blocking system control apparatus which detects the signals of the transmitters or pick-ups 18 to 21 and processes these signals. These signals could then be transmitted to the control apparatus 12 by way of the data line 24 so that the transmitters or pick-ups 18 to 21 could be dispensed with.

Figure 3:
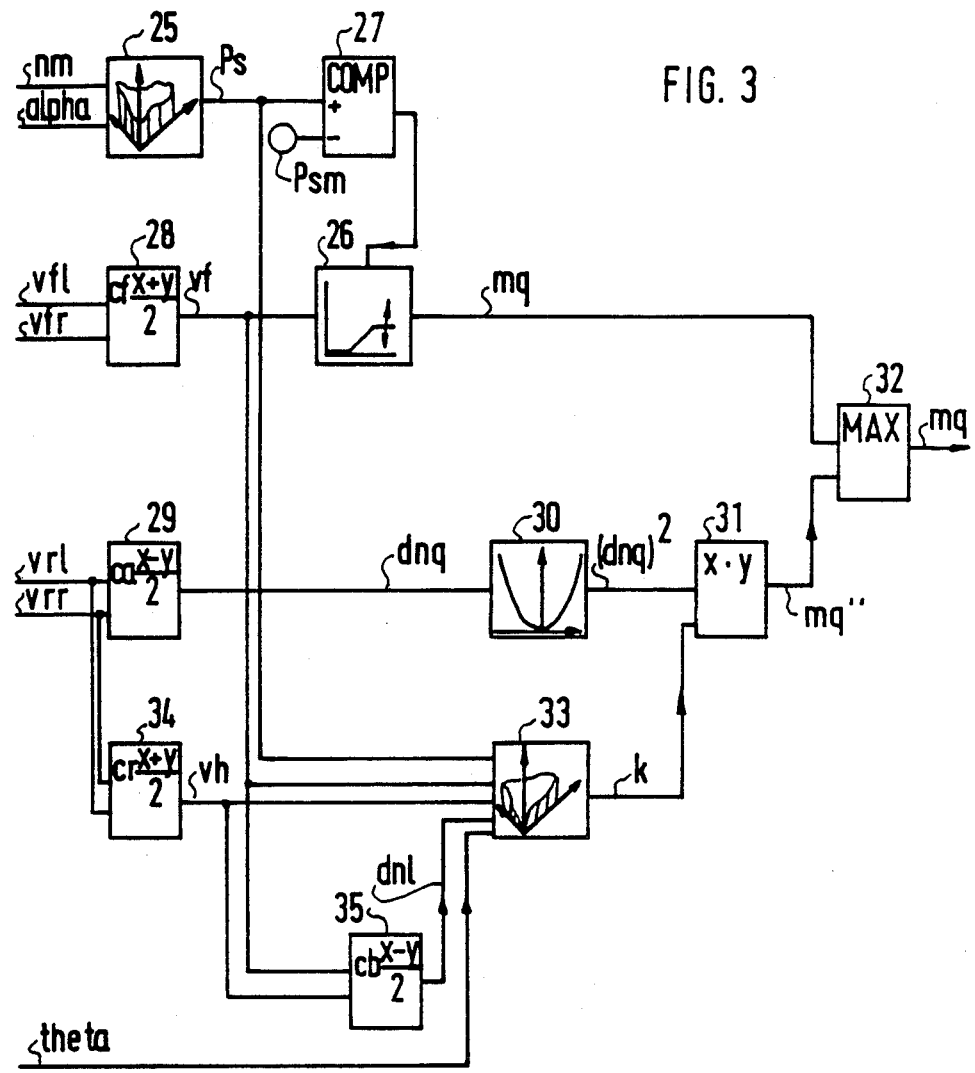
FIG. 3 is a block diagram of a control method implemented in the control apparatus in accordance with the present invention.

The function of the control apparatus 12, i.e., the preparation of the control magnitude mq in dependence on the input magnitudes is shown in FIG. 3 by reference to a block diagram. A desired power output Ps is determined by way of a performance graph (set of characteristic curves) 25 from the engine rotational speed nm and from the drive pedal position phi (not shown), respectively, throttle valve angle alpha, which with internal combustion engines having turbochargers depends additional from the charging pressure pm and the suction air temperature T1 (also not shown). A characteristic curve performance graph 26 produces a first control magnitude mq'. The characteristic curve from the characteristic curve performance graph 26 on which the first control magnitude mq' is based, is selected by a comparator 27 which compares the desired power output Ps with a power output value Psm lying within the middle range of the power output band available from the internal combustion engine, preferably at 50% of the maximum Psmax. If Ps is smaller than Psm, then the control magnitude mq' corresponds to a first control magnitude mq'h effecting a higher locking value (for example 20% locking action); if Ps is larger than Psm, then the control magnitude mq' corresponds to a second control magnitude mq'n effecting a lower locking value (for example 5% locking action).

A velocity-dependent characteristic is adapted to be superimposed on the control magnitude mq' by way of this characteristic curve performance graph 26, for which purpose the velocity vf of the vehicle is determined from the rotational speeds vfl and vfr of the non-driven wheels 5 and 6 by way of an average value formation 28. At least with Ps smaller than Psm, the first control magnitude is set equal to 0 within a first velocity range between 0 km/h and a velocity vfa (corresponding to 20 km/h), and is continuously raised up to the predetermined value depending on power output in a second adjoining velocity range (between vfa and vfb, corresponding, for example, to 50 km/h). With Ps larger than Psm, it may be appropriate under some circumstances to suppress the velocity-dependent characteristic and to indicate always the lower locking value.

The activation of the differential 4's locking mechanism, however, becomes even more meaningful when an a-posteriori-control of the rotational speed difference dnq of the wheels 5 and 6 of the driven axle 7 (counteracts the same during the occurrence of rotational speed differences) is superimposed on the above-described a-priori-control (acts in the pre-performance graph for preventing the turning-in); such an activation is already described in the aforementioned Offenlegungs- and patent publications so that the preparation of a second control value mq" representing the same will be described only briefly.

For that purpose the rotational speed difference dnq (corresponds to the rotational speed difference of the output shafts of the differential, up to a constant factor) is determined by way of a difference formation 29 from the velocities vrl and vrr of the wheels 5 and 6 of the driven axle. An exponentiation 30, preferably, however, the square $(dnq^2)$ is formed from this rotational speed difference dnq. The second control value mq" results from the product, respectively, products 31 thereof with a factor k, which compares a maximum value selection 31 that indicates the final activating magnitude mq for the activation of the adjusting member 8, with the first control magnitude mq' and coordinates the larger of the two values mq', mq" to the activating magnitude mq.

The factor k can either be constant or can be determined by way of a performance graph 33 from the desired power output Ps and/or the vehicle velocity vf and/or the velocity vh of the driven wheels determined by way of an average value formation 34 and/or from the rotational speed difference dnl determined from the difference 35 of the two velocities and/or from the steering angle theta.

Figure 4:
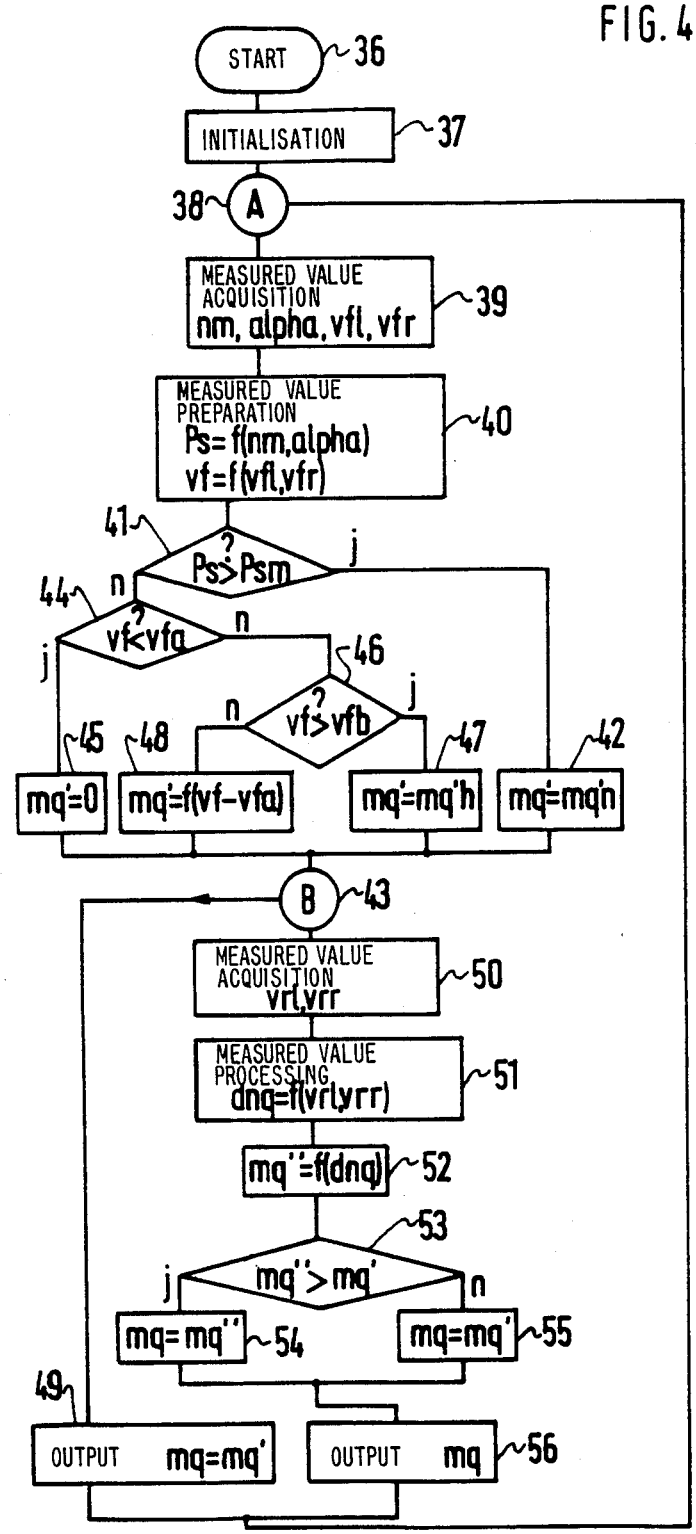
FIG. 4 is a flow diagram of a control program for realizing the control method in accordance with the present invention with a microprocessor.

A programmed realization of the control is illustrated in FIG. 4 by reference to a flow diagram.

The program begins at 36 and after an initialization step 37 in which the memories and program counters are reset, reaches a label A, 38. From there takes place initially the measured value acquisition 39 of the measured values supplied by the sensors 13, 14 or 15, 18 and 19 (and under some circumstances 16 and 17). The measured value processing 40 takes place in the following program step, i.e., the desired power output Ps and the velocity vf are determined thereat from the magnitudes nm, alpha (or theta and pl, Tm) and vfl and vfr.

A determination is made in an interrogation 41 whether the desired power output Ps is larger than the power value Psm. If yes, the first activating value mq' is set to the control magnitude mq'n, 42 corresponding to the lower locking value and is branched off to the further label B, 43.

If the interrogation 41 is negative, then an interrogation takes place next whether vf lies within the lower velocity range, 44. If yes, the first activating value mq' is set to 0, 45 and the program proceeds to the label B, 43.

If no, the program branches to the next interrogation 46 which examines whether vf lies above the second velocity range. If this is the case, the first activating value mq' is set to the control magnitude mq'h, 47 corresponding to the higher locking value, and the program proceeds to the label B, 43. If this is not the case, then the first activating value is determined corresponding to the relationship mq'=f(vf−vfa), 48 and the program jumps to label B, 43.

The return to the label A, 38 either takes place directly from the label B, 43 with an output of the activating value mq', 49, or in case the a-posteriori-control is to be superimposed on the a-priori-control, a measured value acquisition 50 of the values vrl, vrr and a measured value processing 51 of these values takes place for the determination of the rotational speed difference dnq = f(vrl, vrr) at the wheels of the driven axle.

After the formation of the second control magnitude mq"=f(dnq), for example, corresponding to the square of the rotational speed difference dnq, 52, an interrogation 53 takes place in the program whether the second control magnitude mq" is larger than the first control magnitude mq'. If yes, the control magnitude mq is set corresponding to the second control magnitude mq", 54, if no, it is set equal to the first control magnitude, 55. The return to the label A, 38, with output of the control value mq to the adjusting member 8, 56 takes place from both branches. The program sequence begins anew from the label A, 38.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

WE CLAIM:

1. An arrangement for the control of the power transmission onto at least one axle of a motor vehicle provided with a lockable differential means, comprising adjusting means for adjusting the locking acting of the lockable differential means, control means for activating by way of the adjusting means the differential means continuously controllable in its locking action in dependence on operating or driving parameters, a power output of an internal combustion engine serving as controlling operating parameter, and the control means acting upon the adjusting means with a first value of a first control magnitude corresponding to a higher locking value up to a power output value lying in a middle range of a power output band available from the internal combustion engine and above this power output value with a second value of a control magnitude corresponding to a lower locking value.

2. An arrangement according to claim 1, wherein the control means includes a microprocessor.

3. An arrangement according to claim 1, wherein the drive parameter of vehicle velocity is used as further controlling parameter, and wherein said control means is operable to cancel the locking action in a first low velocity range and in a second higher velocity range is operable to increase the control magnitude with increasing velocity beginning with zero to the control magnitude corresponding to a predetermined locking value dependent on power output.

4. An arrangement according to claim 3, wherein a further control magnitude is superimposed on the first-mentioned control magnitude which depends at least from a function of rotational speed difference at output shafts of the differential means.

5. An arrangement according to claim 4, wherein the further control magnitude depends additionally from a function of the power output or a rotational speed difference between wheels of two axles of the motor vehicle or a steering angle.

6. An arrangement according to claim 5, wherein the function of the rotational speed differences corresponds to an exponentiation of the rotational speed difference at the output shafts of the differential means.

7. An arrangement according to claim 6, wherein the exponentiation corresponds to the square.

8. An arrangement according to claim 6, wherein the adjusting means is activated in each case with the larger value of the two control magnitudes.

9. An arrangement according to claim 8, wherein the power output lies within the range of about 50%, the higher locking value at about 20% locking action and the lower locking value at about 5% locking action.

10. An arrangement according to claim 9, wherein the lower velocity range lies between about 0 km/h and about 20 km/h and the higher velocity range between about 20 km/h and about 50 km/h.

11. An arrangement according to claim 1, wherein a further control magnitude is superimposed on the first-mentioned control magnitude which depends at least from a function of rotational speed difference at output shafts of the differential means.

12. An arrangement according to claim 11, wherein the further control magnitude depends additionally from a function of the power output or a rotational speed difference between wheels of two axles of the motor vehicle or a steering angle.

13. An arrangement according to claim 12, wherein the function of the rotational speed differences corresponds to an exponentiation of the rotational speed difference at the output shafts of the differential means.

14. An arrangement according to claim 13, wherein the exponentiation corresponds to the square.

15. An arrangement according to claim 1, wherein the adjusting means is activated in each case with the larger value of the two control magnitudes.

16. An arrangement according to claim 1, wherein the power output lies within the range of about 50%, the higher locking value at about 20% locking action and the lower locking value at about 5% locking action.

17. An arrangement according to claim 1, wherein the lower velocity range lies between about 0 km/h and about 20 km/h and the higher velocity range between about 20 km/h and about 50 km/h.

* * * * *